US010662862B2

(12) United States Patent
Loya et al.

(10) Patent No.: US 10,662,862 B2
(45) Date of Patent: May 26, 2020

(54) ENGINE COOLING SYSTEM WITH TWO COOLING CIRCUITS

(71) Applicant: Progress Rail Locomotive Inc., LaGrange, IL (US)

(72) Inventors: Sudarshan Loya, Aurangabad (IN); Reddy Pocha Siva Sankara, Naperville, IL (US); Xiao Fu, Countryside, IL (US); Vijaya Kumar, Naperville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 66 days.

(21) Appl. No.: 16/148,330

(22) Filed: Oct. 1, 2018

(65) Prior Publication Data
US 2020/0102880 A1 Apr. 2, 2020

(51) Int. Cl.
| *F01P 7/16* | (2006.01) |
| *F01P 11/02* | (2006.01) |
| *F01P 3/12* | (2006.01) |
| *F02B 29/04* | (2006.01) |
| *F01P 3/20* | (2006.01) |
| *F01P 7/14* | (2006.01) |

(52) U.S. Cl.
CPC ............. *F01P 7/165* (2013.01); *F01P 3/12* (2013.01); *F01P 3/20* (2013.01); *F01P 11/0276* (2013.01); *F02B 29/0443* (2013.01); F01P 2007/146 (2013.01); F01P 2060/02 (2013.01)

(58) Field of Classification Search
CPC ...... F01P 7/165; F01P 3/12; F01P 3/20; F01P 11/0276; F01P 2007/146; F01P 2060/02; F01P 11/02; F01P 11/20; F02B 29/0443
See application file for complete search history.

(56) References Cited

U.S. PATENT DOCUMENTS

| 4,126,108 | A | 11/1978 | Christensen |
| 5,809,945 | A | 9/1998 | Creeron et al. |
| 5,937,802 | A | 8/1999 | Bethel et al. |
| 6,050,230 | A | 4/2000 | Seiler et al. |
| 8,596,201 | B2 | 12/2013 | Kral |
| 8,696,394 | B1 | 4/2014 | Langenfeld et al. |

(Continued)

FOREIGN PATENT DOCUMENTS

CN 201506249 U 6/2010

*Primary Examiner* — Jacob M Amick
(74) *Attorney, Agent, or Firm* — Miller, Matthias & Hull

(57) ABSTRACT

A cooling system is disclosed for an internal combustion engine. The cooling system may include a first cooling circuit having a first coolant that flows through cooling channels of an engine, and a second cooling circuit having a second coolant that flows through a charge air cooling component. The cooling system may further include a drain line adapted for fluid communication with the first and second cooling circuits. A first temperature responsive valve disposed on the second cooling circuit may be included, the first temperature responsive valve configured to open to allow mixing of the first and second coolants when the temperature of the second coolant is at a preselected minimum temperature. Also included may be a second temperature responsive valve disposed on the drain line and configured to open to drain both cooling circuits when the temperature of the first and second coolants is at a preselected minimum temperature.

20 Claims, 2 Drawing Sheets

(56) References Cited

U.S. PATENT DOCUMENTS

| | | | |
|---|---|---|---|
| 2004/0140366 A1* | 7/2004 | Uzkan | F01P 7/165 237/41 |
| 2005/0193963 A1* | 9/2005 | Hedrick | B60L 7/02 123/41.14 |
| 2015/0273976 A1* | 10/2015 | Enomoto | B60K 6/22 165/202 |

* cited by examiner

ENGINE COOLING SYSTEM WITH TWO COOLING CIRCUITS

TECHNICAL FIELD

The present disclosure relates generally to an engine cooling system and methods and, more particularly, relates to an engine cooling system having two cooling circuits and temperature responsive valves.

BACKGROUND

Railroad locomotives, as well as other vehicles, commonly employ engine systems that may include an exhaust gas recirculation (EGR) system associated therewith. The EGR system is configured to reduce emissions and increase efficiency of the engine system by recirculating a part of the exhaust gases to an air intake system of the engine. The engine is typically a turbocharged internal combustion engine, which generates considerable heat when operating. If not properly dissipated, this heat reduces the operating efficiency of the engine and can ultimately result in damage to the engine. It is known to provide engine cooling systems having a first cooling circuit, sometimes called a jacket water cooling circuit, which flows a coolant through channels in the engine block to cool the engine. The coolant captures heat from the engine and releases the heat via a radiator through which the coolant eventually passes. The coolant may be pumped through various engine components, including the engine oil cooler, to capture heat from each of the components.

It is also known to provide a second cooling circuit in an engine cooling system that flows coolant through intercoolers and aftercoolers associated with the engine turbochargers. Specifically, the use one or more turbochargers for compressing air to be supplied to one or more combustion chambers within the engine cylinders is common. The turbocharger supplies combustion air or charge air at a higher pressure and higher density than existing atmospheric pressure and ambient density. Compression of air by the turbocharger also significantly increases its temperature. To overcome the detrimental effects of the increase in temperature, intercoolers have been provided in the charge air flow path between compressors of the turbocharger system. Similarly, aftercoolers have been used further downstream in turbocharger systems having both single stage and multi-stage compressors. The aftercooler cools the compressed air being supplied to the intake manifold of the engine to better support combustion in the cylinders and to decrease engine operating temperatures. This second cooling circuit, sometimes called a charge air cooling circuit, circulates coolant through the intercooler/aftercooler components, providing a heat exchange medium for the compressed air also flowing through these components. Heat from the compressed air captured by this coolant may also be released via a radiator.

Locomotives and other machines operate in a variety of environments, including in cold weather where ambient temperatures may fall to below the freezing point of water. When not operating, the heat of the engine system, especially in a cold ambient environment, will dissipate rapidly. Also, in cases where the engine is operating at an ambient temperature below freezing, the coolant itself may approach a freezing temperature. In such conditions, the coolant, typically water, may freeze within the cooling system causing damage to the components of the engine system. Because of this potential problem, it is known to equip engine cooling systems with a drain line having a valve thereon. For example, either or both of the above-described first and second cooling circuits may be provided with individual drain lines. The drain lines may intersect or merge downstream proximate a drain valve disposed on a common drain line. The drain valve may be a temperature responsive valve that opens to drain coolant when a certain low temperature threshold is met. For example, should the coolant temperature drop to below around 35-40° F., the drain valve may open to allow drainage of coolant from the system. Drain valves are typically located at a low gravitational point relative to the cooling circuits such that all of the coolant can drain out of the coolant systems when such valves are opened.

This method of draining coolant from the two cooling circuits functions adequately for avoiding freeze-ups of coolant in the engine system; however, there remains room for improvement. While water is typically used as the coolant in both the first and second cooling circuits described above, for maximized efficiency, the water for each circuit is preferably maintained at significantly different temperatures. For example, depending on the ambient temperature, the jacket water coolant should be maintained at a temperature above 180° F., while the charge air coolant should be maintained at a temperature above the ambient temperature but much lower than the jacket water coolant temperature. For this reason, it is preferable that the coolants of the two different circuits are not allowed to mix.

However, in locomotive applications, the mixing of the two water coolants has been common, decreasing the efficiency of the engine system. Specifically, when the engine is operating normally and the drain valve is closed, the coolants of the two different circuits are allowed to mix together in the common drain line. While only a small percentage of the two coolants mix in this drain line, this drain line is in fluid communication with the entirety of the two cooling circuits. As such, any change in the coolants due to the mixing may be transferred to the entirety of the circuits. Mixing of jacket water coolant with charge air coolant results in a decrease in the jacket water coolant temperature and an increase in the charge air coolant temperature. For instance, it has been observed that the mixing of only five percent of the two coolants can cause the coolant in both circuits to approach the same temperature within a few minutes. This mixing of the two coolants may not only defeat the purpose of maintaining two independent circuits, it may cause a loss in the efficiency of both cooling circuits. However, circumstances may arise where intermittent mixing of coolants, and therefore, increasing the temperature of the charge air coolant may be advantageous.

For example, the mixing of the two coolants may be preferred during sub-freezing operations where the engine is only idling. In this case, there is no real heat addition to the charge air cooling system as there is no heat being generated by the compressor. This may lead to freezing of the coolant in the charge air cooling circuit as locomotives are oftentimes kept idling for days in cold environments in order to keep the water in the jacket water circuit above freezing. During such operations, it is preferable that the coolants of both cooling systems be allowed to mix in order to keep the coolant of the charge air cooling system above its freezing point. Accordingly, there remains a need in the industry for a system capable of providing both mixing of the coolants and/or draining of the coolants as needed, based upon the relevant temperatures.

The presently disclosed engine cooling systems and methods address one or more of the above-described problems and/or other problems in the art.

SUMMARY

In accordance with one aspect of the present disclosure, a cooling system for an internal combustion engine is disclosed which may include a first cooling circuit having a first coolant directed to flow through one or more cooling channels of an engine, and a second cooling circuit having a second coolant directed to flow through at least one charge air cooling component. The disclosed cooling system may also include at least one drain line adapted for fluid communication with the first cooling circuit and the second cooling circuit. The disclosed cooling system may further include a first temperature responsive valve disposed on a passage of the second cooling circuit, the first temperature responsive valve configured to open to allow mixing of the first and second coolants in response to the temperature of the second coolant being at a preselected minimum temperature. In addition, the cooling system may include a second temperature responsive valve disposed on the drain line downstream of the first temperature responsive valve and configured to open to drain the first and second cooling circuits in response to the temperature of the first and second coolants being at a preselected minimum temperature.

In accordance with another aspect of the present disclosure, an internal combustion engine system including an engine block having one or more combustion cylinders and one or more turbochargers is disclosed. The engine system may include an engine cooling circuit having a first heat exchanger configured to receive a first coolant flowing from a cooling channel in the engine block and to reduce the temperature of the first coolant, the engine cooling circuit being adapted with an engine cooling circuit drain line; and an aftercooler cooling circuit having a second heat exchanger configured to receive a second coolant flowing from an aftercooler associated with at least one turbocharger and to reduce the temperature of the second coolant, the aftercooler cooling circuit being adapted with an aftercooler cooling circuit drain line. The disclosed engine system may further include a principal drain line adapted for fluid communication with the engine cooling circuit and the aftercooler cooling circuit. In addition, the engine system may include a first temperature responsive valve disposed on the aftercooler cooling circuit drain line, the first temperature responsive valve configured to open to allow mixing of the first and second coolants in response to the temperature of the second coolant being at a preselected minimum temperature. And the engine system may also include a second temperature responsive valve disposed on the principal drain line and configured to open to drain the engine and aftercooler cooling circuits in response to the temperature of the coolant in the principal drain line being at a preselected minimum temperature.

In accordance with yet another aspect of the present disclosure, a method of cooling an internal combustion engine having one or more turbochargers is disclosed. The disclosed method may include the steps of providing an engine cooling circuit for circulating a first coolant through the engine to absorb heat from the engine, the engine cooling circuit being adapted with an engine cooling circuit drain line; and providing an aftercooler cooling circuit for circulating a second coolant through an aftercooler associated with at least one of the turbochargers to absorb heat from the aftercooler, the aftercooler cooling circuit being adapted with an aftercooler cooling circuit drain line having a first temperature responsive valve disposed thereon. The method may also include the step of providing a principal drain line capable of fluid communication with both the engine cooling circuit drain line and the aftercooler cooling circuit drain line, the principal drain line having a second temperature responsive valve disposed thereon. Further, the method may include the step of maintaining the first temperature responsive valve closed when the temperature of the second coolant is above a preselected minimum temperature. In addition, the method may include the step of opening the first temperature responsive valve when the temperature of the second coolant is at the preselected minimum temperature, allowing the first and second coolants to mix.

These and other aspects and features of the present disclosure will be better understood from the following description read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
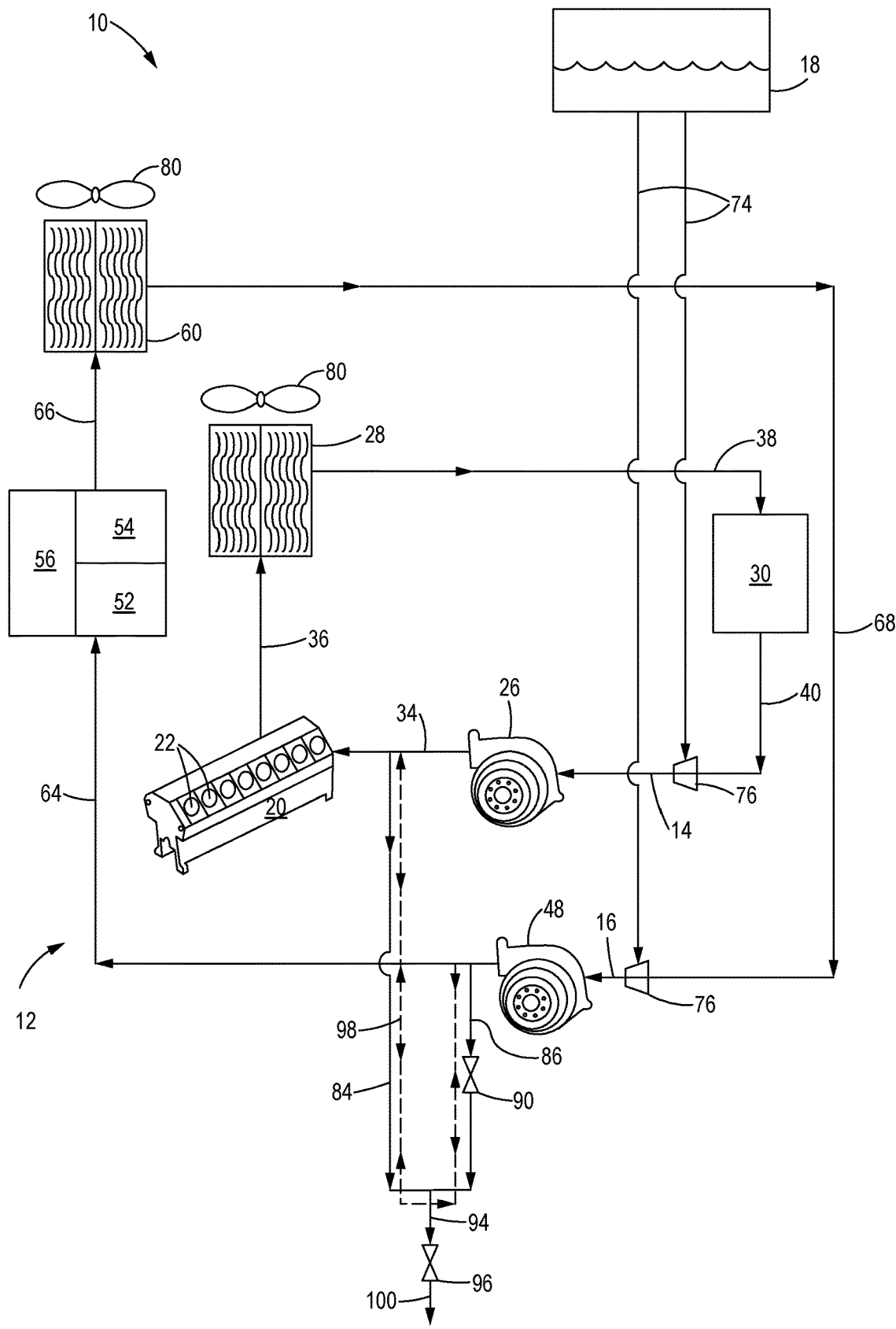
FIG. 1 is a pictorial and schematic illustration a cooling system for an internal combustion engine, according to an embodiment of the present disclosure.

Referring to FIG. 1, an internal combustion engine cooling system 10 is shown, for and as part of an engine 12. The cooling system 10 includes an engine cooling circuit 14, sometimes referred to as a jacket water circuit, and an aftercooler cooling circuit 16, sometimes referred to as a charge air cooling circuit. Common to the engine cooling circuit 14 and the aftercooler cooling circuit 16 is a coolant reserve or tank 18 containing a coolant such as water. In some applications, the coolant may be a glycol, a water/glycol mixture, a blended air mixture, or any other heat transferring fluid.

The exemplary disclosed engine 12 combusts a fuel/air mixture to produce a power output. The engine 12 includes an engine block 20 that at least partially defines a plurality of cylinders 22 in which fuel and air are combusted in a known manner One skilled in the art will recognize that the engine 12 may be any type of internal combustion engine, such as a diesel engine, or a gasoline or a gaseous fuel-powered engine. In the illustrated embodiment, the engine 12 includes sixteen cylinders 22 (eight shown). However, it is contemplated that the engine 12 may include a greater or lesser number of cylinders 22 and that the cylinders 22 may be disposed in an "in-line" configuration, a "V" configuration or any other suitable configuration. The engine 12 also includes pistons, valves, manifolds and the like (not shown), descriptions of which are not necessary to an understanding of the present disclosure. It is contemplated that the engine 12 may be associated with additional systems such as, for example, a fuel system, a lubrication system, a braking system, an air conditioning system, an exhaust system, an emissions control system, a control system and other such known systems, which may be used to facilitate the operation of the engine 12. Finally, the engine 12 may provide power to various types of mobile and stationary applications and/or to machines, such as locomotives, excavating machines, passenger vehicles, electric generators, mining trucks, marine vessels, agricultural machines and the like.

As part of the engine cooling circuit 14, the engine block 20 has one or more coolant channels provided therein (not shown) for circulating coolant through the engine 12 as well understood in the art. This engine cooling circuit 14 may circulate coolant through various components that facilitate cooling of the engine 12, such as a pump 26, a heat exchanger 28 and a lubrication oil cooler 30. The engine cooling circuit 14 may further include a hydraulic oil cooler, a brake oil cooler and various valves and sensors (not shown). Coolant flowing through the engine cooling circuit 14 is herein referred to as the first coolant. First coolant passageways 34, 36, 38, 40 may be provided to circulate the first coolant throughout the engine cooling circuit 14. Specifically, the first coolant may be pressurized by the pump 26 and directed through the passageway 34 to the engine block 20 to absorb heat therefrom. After exiting the engine block 20, the first coolant may pass through the passageway 36 to the heat exchanger 28 to release the absorbed heat. In the engine cooling circuit 14 illustrated, the first coolant may also pass through the passageway 38 before entering the lubrication oil cooler 30 to absorb heat therefrom. The first coolant may then be drawn in through the passageway 40 back to the pump 26. While not illustrated, one with skill in the art will understand that the engine cooling circuit 14 may include additional components, including additional heat exchangers. Further, the order of the components through which the first coolant passes may vary from that described and illustrated herein. Moreover, the engine cooling circuit 14 may include bypass circuits that direct the first coolant around certain components in response to one or more predetermined input parameters for proper cooling within the engine cooling circuit 14.

The aftercooler cooling circuit 16 may include components that facilitate cooling of air drawn or forced into the engine 12. For example, the aftercooler cooling circuit 16 may circulate coolant through a pump 48, one or more intercoolers 52 and one or more aftercoolers 54 associated with one or more turbochargers 56, a heat exchanger 60, as well as various other components, valves and sensors (not shown). Coolant flowing through the aftercooler cooling circuit 16 is herein referred to as the second coolant. Second coolant passageways 64, 66, 68 may be provided to circulate the second coolant throughout the aftercooler cooling circuit 16. Specifically, the second coolant may be pressurized by the pump 48 and directed through the passageway 64 to and through one or more intercoolers 52 and aftercoolers 54 having internal coolant passages to absorb heat therefrom. In the intercooler 52 and the aftercooler 54, the second coolant supplied thereto passes in a heat exchange relationship with compressed or charge air from the one ore more turbochargers 56, as well understood by those with skill in the art. The turbocharger 56 may be a single or multiple stage turbocharger, in any known manner or configuration, a further description of which is not necessary for an understanding of the present disclosure. Further, the intercooler 52 and the aftercooler 54 may be of any various number or designs, the details of which are not necessary for an understanding of the present disclosure.

After exiting the intercooler 52 and the aftercooler 54, or the aftercooler 54 alone, the second coolant may pass through the passageway 66 to the heat exchanger 60 to release the absorbed heat, and thereafter be drawn in through the passageway 68 back to the pump 48. While not illustrated, one with skill in the art will understand that the aftercooler cooling circuit 16 may include additional components, including additional heat exchangers. Further, the order of the components through which the second coolant passes may vary from that described and illustrated herein. Moreover, the aftercooler cooling circuit 16 may include bypass circuits that direct the second coolant around certain components in response to one or more predetermined input parameters for proper cooling within the aftercooler cooling circuit 16.

Coolant from the coolant reserve or tank 18 may supply the engine cooling circuit 14 and the aftercooler cooling circuit 16 with the first and second coolants, respectively, in a well known manner through coolant supply passages 74 and optional aspirators 76 upstream of the pumps 26, 48. The pumps 26, 48 may be engine driven or electrically driven, centrifugal pumps that generate the flow of the first and second coolants described above. The pumps 26, 48 may each include an impeller (not shown) disposed within a volute housing having an inlet and an outlet. As the coolant enters the volute housing, blades of the impeller may be rotated by operation of the engine 12 to push against the coolant, thereby pressurizing the coolant. An input torque imparted by the engine 12 to the pumps 26, 48 may be related the pressure of the coolant, while a speed imparted to the pumps 26, 48 may be related to the engine speed. It is contemplated that the pumps 26, 48 may alternatively embody piston-type pumps, if desired, and may have a variable or constant displacement. One skilled in the art will recognize that any number of pumps may be used to generate the flows of coolants in the circuits 14, 16.

The heat exchangers 28, 60 for the engine cooling circuit 14 and the aftercooler cooling circuit 16, respectively, may be air-to-liquid exchangers. Specifically, a flow of air may be directed through channels of the heat exchangers 28, 60 such that heat from the coolants in adjacent channels is transferred to the air. For example, the heat exchangers 28, 60 may be radiators having an upper tank, a lower tank and a core of spaced apart tubes, as commonly understood in the art. Each cooling circuit may include a plurality of heat exchangers, which may be of varying sizes and/or multipass heat exchangers. The heat exchangers 28, 60 are situated to dissipate heat from the first and second coolants after passing through the engine block 20 and the aftercooler 54, respectively. Variable speed cooling fans 80 may be associated with the heat exchangers 28, 60 to generate the flow of cooling air across the heat exchangers 28, 60 to promote accelerated heat transfer between the heat exchangers 28, 60 and the atmosphere. In particular, the fans 80 may include an input device (not shown) such as a belt driven pulley, a hydraulically driven motor or an electrically powered motor that is mounted to the engine 12, and fan blades fixedly or adjustably connected thereto. The cooling fans 80 may be powered by the engine 12 to cause the fan blades to blow or draw air across the heat exchangers 28, 60. Further, the cooling fans 80 may be positioned differently relative their respective heat exchangers 28, 60. In this manner, the first and second coolants may each be cooled to predetermined, different optimal temperatures for each of the cooling circuits 14, 16.

An engine cooling circuit drain line 84 passage may also be provided to facilitate draining of the engine cooling circuit 14 when necessary. Likewise, an aftercooler cooling circuit drain line 86 passage may be provided to facilitate draining of the aftercooler cooling circuit 16 when necessary. The drain line 84 is in fluid communication with the engine cooling circuit 14, as illustrated. As such, the drain line 84 may contain therein the first coolant, which under normal operating conditions, is flowing through the engine cooling circuit 14. Likewise, the drain line 86 is in fluid communication with the aftercooler cooling circuit 16, as illustrated. As such, the drain line 86 may contain therein the second coolant, which under normal operating conditions is flowing through the aftercooler cooling circuit 16.

Temperature responsive valves may participate in the control of coolant flows through the drain lines, and therefore throughout the cooling circuits 14, 16. For example, as illustrated in FIG. 1, a first temperature responsive valve 90 may be disposed on the aftercooler cooling circuit drain line 86, the first temperature responsive valve 90 having open and closed positions. The first temperature responsive valve 90 may move from a closed position during normal operation of the engine 12 to an open position, the details of which will be discussed further. Downstream of the first temperature responsive valve 90, the drain lines 84, 86 may merge into a principal drain line 94, as illustrated. The principal drain line 94, being capable of fluid communication with both drain lines 84, 86 may further facilitate draining of both the engine cooling circuit 14 and the aftercooler cooling circuit 16 when necessary. A second temperature responsive valve 96 may be disposed on the principal drain line 94, the second temperature responsive valve 96 having open and closed positions. The second temperature responsive valve 96 may move from a closed position during normal operation of the engine 12 to an open position, as detailed below. The second temperature responsive valve 96 may be disposed on the principal drain line 94 at a low gravitational point within the engine cooling system 10, thereby allowing fluid flow using gravity and at normal atmospheric pressure to drain both circuits 14, 16 of the engine cooling system 10.

A person with skill in the art will appreciate that alternative types and placements of the first and second temperature responsive valves 90, 96 and/or configurations of the drain lines 84, 86, 94 are feasible and within the scope of the present disclosure. The first and second temperature responsive valves 90, 96 may be any of various temperature responsive valves known in the art, or a combination thereof, capable of opening when the relevant coolant temperature reaches a preselected temperature. For example, the first and second temperature responsive valves 90, 96 may be well known thermostatic valves. As such, a thermostat may respond to the coolant temperature within the relevant passage and open or close by an amount dictated by the operating characteristics of the thermostat and the temperature of the coolant that is in thermal communication with the thermostat.

Alternatively, the first and second temperature responsive valves 90, 96 may be electrically controlled using temperature sensors and controls (not shown), as also well known in the art. For example, a thermistor may be mounted on the valve body so as to be in thermal communication with the coolant located adjacent to the valve body. In this manner, a control unit may be signaled to open, close or rotate the relevant temperature responsive valve. The first and second temperature responsive valves 90, 96 may be two or three-way valves, L-port or T-port valves, or a combination thereof. In addition, one or both of the temperature responsive valves 90, 96 may be retrofitted valves adapted in a known manner to already existing engine cooling systems.

Though not specifically depicted, one with skill in the art will understand that the disclosed engine system may include a control unit configured to control and monitor various operations and functions of the engine system. The control unit may function using sensors associated with different engine systems. The sensors may be connected to the control unit via multiple electric wires. For example, the above-described temperature responsive valves 90, 96 may be electronically controlled valves that rely on temperature sensors that measure coolant temperatures within the cooling circuits and/or adjacent the valves 90, 96. In response to data received, a control unit may operate the positioning of the valves 90, 96 and therefore the flow of the coolants in the cooling system 10. Further, a control unit may be configured to regulate the operation of the cooling system pumps 26, 48. Control units, also known as a control modules or controllers, may take many forms including a computer based system, a microprocessor based system or any other system known in the art. Finally, a person with skill in the art will appreciate that such a control unit may additionally include other components and may also perform other functions not described herein.

Figure 2:
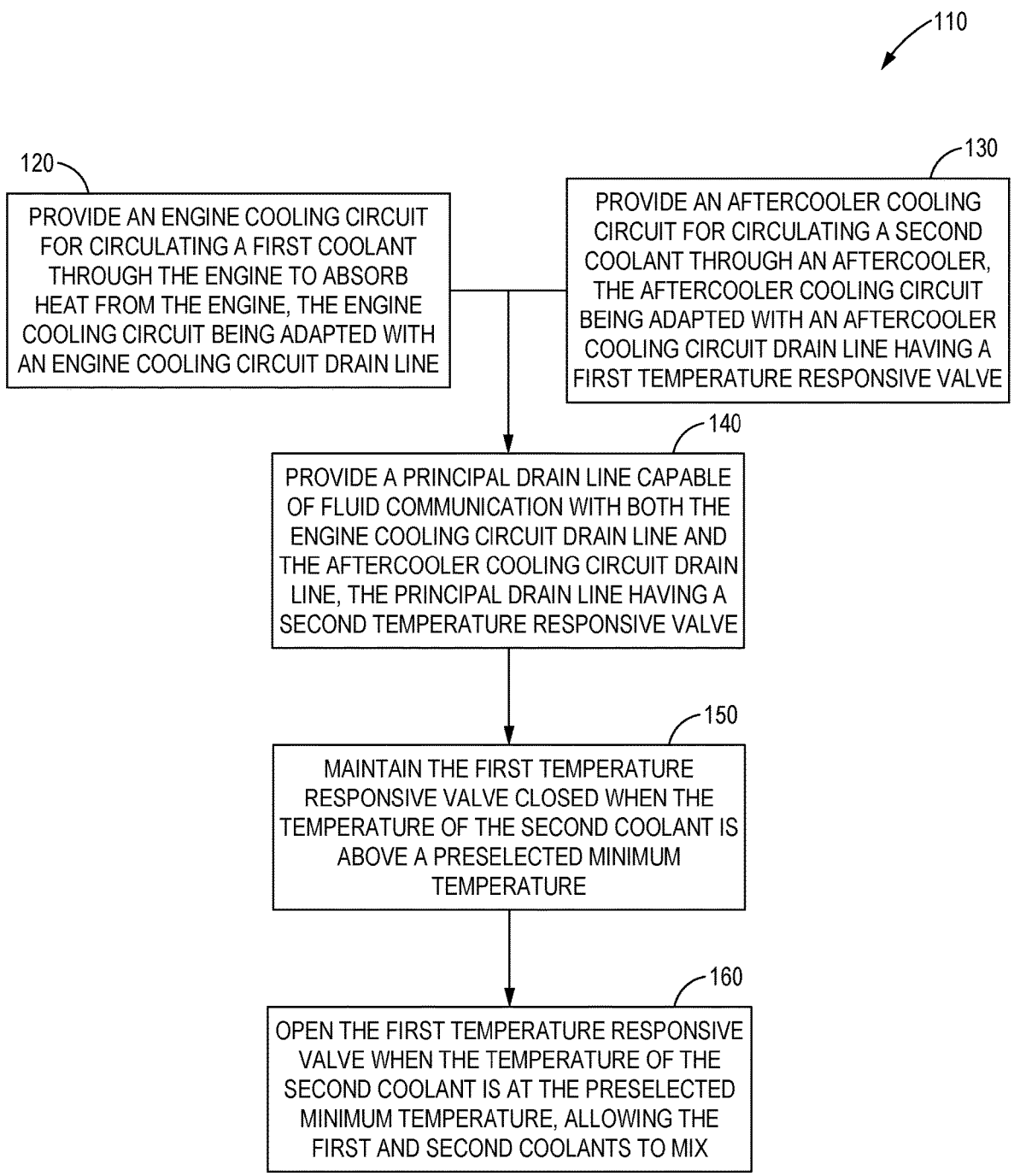
FIG. 2 is a flowchart illustrating a method of cooling an internal combustion engine having one or more turbochargers, according to an embodiment of the present disclosure.

FIG. 2 shows a flow chart for a method of cooling an internal combustion engine having one or more turbochargers. FIG. 2 is discussed in more detail in the following section to further illustrate the disclosed concepts.

INDUSTRIAL APPLICABILITY

The presently disclosed engine cooling system 10 may have applicability with gas or diesel-based internal combustion engines. Engines utilizing the disclosed engine cooling system 10 may be used to power any vehicle, machine or other mobile or stationary device, including locomotives, on-highway trucks or vehicles, off-highway trucks or vehicles, earth moving equipment, generators, aerospace applications, marine applications and other engine powered applications. During use of the engine cooling system 10 described herein, the engine 12 is operated in a known manner, with the resultant and inevitable generation of heat. The disclosed engine cooling system 10 may operate using any heat transferring fluid as a coolant; however, water remains the most common coolant used in locomotive applications. The disclosed engine cooling system 10 and methods are applicable to the cooling of engines in any environment, but may be especially advantageous in cold environments, as detailed below. In such environments, the temperatures of the coolants flowing through the engine cooling system 10 may drop to levels that decrease the overall efficiency of the engine 12. Coolants in very cold environments are also subject to freezing, therefore presenting significant risks of damage to the engine system.

Engine cooling systems having multiple cooling circuits are common in the art, especially in turbocharged engines where intercoolers and aftercoolers are used to decrease the temperature of compressed or charge air. For example, an engine cooling circuit may function to help dissipate heat from the engine and optional additional components; while an aftercooler cooling circuit may function to dissipate heat from at least one aftercooler associated with the turbocharger of the engine system. As previously explained, in order to maintain optimal operating temperatures of the various engine systems, the coolant in the engine cooling circuit may be maintained at a higher temperature than that of the aftercooler cooling circuit. For example, depending on the ambient temperature, an optimal coolant temperature in an engine cooling circuit may be above 180° F., while the temperature of the coolant in an aftercooler cooling circuit need only be kept above the ambient temperature. In especially cold ambient environments, these coolant temperatures may decrease significantly, thereby decreasing the efficiency of both circuits and the overall efficiency of the engine. This may become especially problematic when the coolant of the aftercooler cooling circuit falls to around 40-60° F. Further, when the coolant temperature in either or both of the cooling circuits falls to around 35-40° F. or below, a freeze-up of coolant throughout the cooling system, and therefore significant damage to the entire engine system may occur.

FIG. 2 shows a flow chart for a method 110 of cooling an internal combustion engine having one or more turbochargers. To begin with, at step 120, an engine 12 is provided with an engine cooling circuit 14 for circulating a first coolant through the engine 12 to absorb heat from the engine 12, the engine cooling circuit 14 being adapted with an engine cooling circuit drain line 84. As described with reference to FIG. 1, the first coolant circulating within the engine cooling circuit 14 may be water received through the coolant supply passage 74 from the coolant tank 18. The pump 26 may be used to pressurize the first coolant and direct it through the engine block 20, which includes numerous coolant channels through with the first coolant may pass to absorb heat from the engine 12. Thereafter, the first coolant may be directed through the heat exchanger 28, which helps to dissipate heat from the first coolant in a known manner, optionally employing the fan 80. As also explained with reference to FIG. 1, the engine cooling circuit 14 may function to cool additional components, including the oil cooler 30, before being routed back to the pump 26. In this manner, the engine cooling circuit 14 functions to circulate the first coolant to cool the engine 12 and to thereafter at least partially rid the first coolant of heat absorbed in the engine cooling process before rerouting the first coolant again through the circuit 14. Finally, the engine cooling circuit drain line 84, which may be in fluid communication with the engine cooling circuit 14, may facilitate the draining of coolant from the engine cooling circuit 14 when necessary, as further detailed below.

Step 130 of the disclosed method 110 of cooling an internal combustion engine having one or more turbochargers requires providing an aftercooler cooling circuit 16 for circulating a second coolant through an aftercooler 54, the aftercooler cooling circuit 16 being adapted with an aftercooler cooling circuit drain line 86 having a first temperature responsive valve 90 disposed thereon. As described with reference to FIG. 1, the second coolant circulating within the aftercooler cooling circuit 16 may be water received through the coolant supply passage 74 from the coolant tank 18. The pump 48 may be used to pressurize the second coolant and direct it through the one ore more intercoolers 52 and aftercoolers 54 associated with the one or more turbochargers 56. The second coolant absorbs heat from the aftercooler 54 before being directed through the heat exchanger 60, which helps to dissipate heat from the second coolant in a known manner, optionally employing the fan 80. Eventually, the second coolant is routed back to the pump 48. In this manner, the aftercooler cooling circuit 16 functions to circulate the second coolant to cool the aftercooler 54 and to thereafter at least partially rid the second coolant of heat absorbed in the aftercooler cooling process before rerouting the second coolant again through the circuit 16. The aftercooler cooling circuit drain line 86, which may be in fluid communication with the aftercooler cooling circuit 16, may facilitate the draining of coolant from the aftercooler cooling circuit 16 when necessary, as further detailed below. In addition, the function of the first temperature responsive valve 90 disposed on the aftercooler cooling circuit drain line 86 is detailed below.

Including a draining route for coolants of engine cooling systems in very cold environments may allow the coolants to be drained, and engine damage therefore avoided. Step 140 of the disclosed method 110 for cooling an internal combustion engine requires providing a principal drain line 94 capable of fluid communication with both the engine cooling circuit drain line 84 and the aftercooler cooling circuit drain line 86, the principal drain line 94 having a second temperature responsive valve 96 disposed thereon. The principal drain line 94 may be the result of the merging of the drain lines 84, 86 to create a single drain line. In an alternative embodiment, where the first temperature responsive valve 90 is disposed directly on the aftercooler cooling circuit 16, the principal drain line 94 may be in combination with or be an extension of the aftercooler cooling circuit drain line 86. It is through this principal drain line 94 that all coolant eventually flows when draining the disclosed engine cooling system 10. Specifically, both the first coolant of the engine cooling circuit 14 and the second coolant of the aftercooler cooling circuit 16 ultimately drain from this principal drain line 94, as illustrated in FIG. 1. This draining of the coolants requires that the second temperature responsive valve 96 be in an open position as opposed to its normal, closed position during operation of the engine 12 and cooling system 10, as further described below.

Turning to the specific functions of the first and second temperature responsive valves 90, 96, during normal operation of the engine 12 and engine cooling system 10, the second temperature responsive valve 96 remains closed and the coolants of both the engine cooling circuit 14 and the aftercooler cooling circuit 16 may be continuously rerouted through the circuits 14, 16. As explained above, it is commonly understood that during normal engine operation, the first coolant is optimally maintained at a higher temperature than that of the second coolant. Engine cooling systems having a common drain line that may be in fluid communication with both the engine and the aftercooler cooling circuits 14, 16 may disadvantageously allow continuous mixing of the first and second coolants within the common drain line. Under normal operating conditions, this integration of the first and second coolants may very quickly cause the temperatures of the two coolants circulating in the two different circuits to equalize. This mixing of the coolants and leveling out of the temperatures of the first and second coolants decreases the efficiency of both the engine and the aftercooler cooling circuits 14, 16, as well as the efficiency of the engine 12 as a whole.

The presently disclosed engine cooling method 110 provides a solution to this problem. Specifically, step 150 requires maintaining the first temperature responsive valve 90 closed when the second coolant is above a preselected minimum temperature. Therefore, during normal operating conditions, the first temperature responsive valve 90, which may be disposed directly on the aftercooler cooling circuit 16 or on the aftercooler cooling circuit drain line 86, may function to block any potential mixing of the second coolant of the aftercooler cooling circuit 16 with the first coolant of the engine cooling circuit 14. In this manner, the coolants of the two cooling circuits 14, 16 may be isolated and circulated separately, even where common a drain line is provided, thereby maintaining the two coolant temperatures at their optimal, different levels. The disclosed method 110, incorporating the first temperature responsive valve 90 in the aftercooler cooling circuit 16, therefore, may result in an improved overall efficiency of the engine 12 during normal operations.

While the advantages to keeping the coolants of the engine and aftercooler cooling circuits 14, 16 isolated from one another and functioning at their optimal, different temperatures within the engine cooling system 10 are apparent, there are circumstances in which the mixing of the two coolants may be advantageous. For example, a cooling system that permits mixing of the coolants may offer advantages in railroad locomotives, or other machines, that oftentimes operate in very cold environments. Locomotive applications commonly use water as a coolant, which may easily be subject to freezing in such cold environments. As previously mentioned, depending on the ambient temperature, an optimal coolant temperature in an engine cooling circuit 14 is above 180° F., while the temperature of the coolant in an aftercooler cooling circuit 16 need only be kept above the ambient temperature. However, when operating in very cold environments, the coolant temperatures may fall significantly below these optimal temperatures, decreasing their efficiency and the overall reliability of the engine system.

The presently disclosed engine cooling system 10 and methods address the potential unfavorable temperature decrease of the second coolant by adapting the aftercooler cooling circuit 16 with the first temperature responsive valve 90. For example, as described above and illustrated in FIG. 1, the first temperature responsive valve 90 may be disposed on the drain line 86 of the aftercooler cooling circuit 16. Alternatively, the first temperature responsive valve 90 may be disposed directly on the aftercooler cooling circuit 16. As part of the method 110 of cooling an internal combustion engine, step 160 requires opening the first temperature responsive valve 90 when the temperature of the second coolant is at the preselected minimum temperature, allowing the first and second coolants to mix. In the illustrated embodiment, such mixing of the two coolants may occur within the engine cooling circuit drain line 84, the aftercooler cooling circuit drain line 86 and the principal drain line 94. The area of initial mixing of the first coolant and the second coolant is illustrated in FIG. 1 by the line/arrows 98.

As described with respect to step 150, under normal operating conditions and above a preselected minimum temperature of the second coolant, the temperature responsive valve 90 remains closed, thereby preventing the two coolants of the two circuits 14, 16 from mixing. However, in extremely cold environmental conditions, when the temperature of the second coolant circulating in the aftercooler cooling circuit 16 falls to a preselected minimum temperature, the temperature responsive valve 90 may open to allow mixing of the two coolants, thereby raising the second coolant temperature to a preferred level. For example, the temperature responsive valve 90 may open when the second coolant temperature falls to below a preselected minimum temperature of around or between 40-60° F. In one embodiment, the preselected minimum temperature may be 55° F. In other embodiments, the preselected minimum temperature may be 40° F., 50° F. or 60° F., or any preselected temperature there between. Once the preselected minimum temperature is reached and the temperature responsive valve 90 opens to allow mixing, the entirety of the second coolant circulating in the aftercooler cooling circuit 16 may increase while the entirety of the first coolant circulating in the engine cooling circuit 14 may decrease. Thereafter, as well understood in the art, the first and second coolant temperatures may individually be further regulated by heat exchangers 28, 60. Where ambient temperatures allow, in order to reestablish the preferred, different temperatures of the two coolants, the temperature responsive valve 90 may revert to a closed position, thereby again isolating the coolants from one another for optimal performance of the cooling system 10, and therefore the overall engine system.

Also in extremely cold environmental conditions, circumstances may evolve to require that the temperature responsive valve 90 remain open, and that the entirety of the cooling system 10 be drained to avoid freezing of the coolants and damage to the engine system. Specifically, where a risk of coolant freezing becomes an issue, it is preferable to drain the first coolant from the engine cooling circuit 14 as well as the second coolant from the aftercooler cooling circuit 16. This requires opening of the second temperature responsive valve 96 disposed on the principal drain line 94 to allow coolant flow 100 out of the cooling system 10. During normal engine operations, the second temperature responsive valve 96 remains closed and the coolants of both circuits 14, 16 may continuously flow and be rerouted through their respective circuits. The second temperature responsive valve 96 also remains closed when the temperature of the second coolant falls to its preselected minimum temperature, for example, around or between 40-60° F., and the first temperature responsive valve 90 opens, thereby allowing the first coolant and the second coolant to mix in the common, fluidly communicating drain lines, as described above with respect to step 160. When, however, the temperature of the mixed coolants adjacent the second temperature responsive valve 96 falls to a preselected minimum temperature, the second temperature responsive valve 96 may also open so that all coolant flowing in the drain lines 84, 86, 94 and throughout the two cooling circuits 14, 16 may be drained from the cooling system 10. For example, the temperature responsive valve 96 may open to allow draining when the temperature of the first and second coolants falls to below a preselected minimum temperature of around or between 35-40° F. Therefore, in some embodiments, the preselected minimum temperature may be 35° F. or 40° F., or any preselected temperature there between.

Coolant in the principal drain line 94 may consist of first coolant from the engine cooling circuit 14, second coolant from the aftercooler cooling circuit 16 and/or may be a mix of the two coolants. In most cases, the coolant to be drained via the second temperature responsive valve 96 will be a mix of the two coolants of the two different circuits 14, 16 as the first temperature responsive valve 90 has already moved to an open position in response to the second coolant being at a preselected minimum temperature of, for example, between around 40-60° F. Therefore, in extremely cold conditions, both the first temperature responsive valve 90 and the second temperature responsive valve 96 may be open, thereby allowing all coolant to drain from both cooling circuits 14, 16. In order for the coolants to flow out of the circuits 14, 16 using gravity and at normal atmospheric pressure, the second temperature responsive valve 96 may be positioned near the lowest gravitational point of the cooling system 10. The pumps 26, 48 may also be engaged to pressurize and to help direct coolants out of the cooling system 10 through the first and second temperature responsive valves 90, 96 when necessary.

The improved engine cooling system and methods disclosed herein overcome numerous disadvantages common in conventional cooling systems. As apparent from the above discussion with reference to FIGS. 1 and 2, the disclosed engine cooling system and methods allow draining of both the engine cooling circuit 14 and the aftercooler cooling circuit 16 when necessary, and particularly, in cold environmental conditions. Further, as opposed to conventional cooling systems that may allow mixing of the coolants of the two distinct circuits in a common drain line during normal engine operation, the disclosed engine cooling system and methods offer the advantage of isolating the coolants of the two different cooling circuits from one another even where they share a common drain line and the engine is operating normally. Moreover, the disclosed engine cooling system and methods offer the advantage of allowing the two coolants to merge and mix when the second coolant falls to a predetermined minimum temperature. In this manner, the overall engine efficiency, in both normal operating environments and in very cold environments, is improved. Finally, either or both of the disclosed temperature responsive valves 90, 96 may be retrofitted to an aftercooler cooling circuit or to a common drain line without requiring any additional system modifications, thereby imparting the above-described advantages of the presently disclosed cooling system and methods to an already existing engine cooling system. In this manner, the disclosed system and methods may provide a cost-effective fix for an engine system that operates in cold environments or between normal and cold environments.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A cooling system for an internal combustion engine, comprising:
   a first cooling circuit having a first coolant directed to flow through one or more cooling channels of an engine;
   a second cooling circuit having a second coolant directed to flow through at least one charge air cooling component;
   at least one drain line adapted for fluid communication with the first cooling circuit and the second cooling circuit;
   a first temperature responsive valve disposed on a passage of the second cooling circuit, the first temperature responsive valve configured to open to allow mixing of the first and second coolants in response to the temperature of the second coolant being at a preselected minimum temperature; and
   a second temperature responsive valve disposed on the drain line downstream of the first temperature responsive valve and configured to open to drain the first and second cooling circuits in response to the temperature of the first and second coolants being at a preselected minimum temperature.

2. The cooling system of claim 1, wherein the first cooling circuit is configured to operate at a higher temperature than the second cooling circuit.

3. The cooling system of claim 1, wherein the first temperature responsive valve is configured to open when the temperature of the second coolant is at around 40-60° F., and the second temperature responsive valve is configured to open when the temperature of the first and second coolants is at around 35-40° F.

4. The cooling system of claim 1, wherein the first temperature responsive valve is a thermostatic valve.

5. The cooling system of claim 1, wherein the first temperature responsive valve is an electronically controlled valve.

6. The cooling system of claim 1, further comprising a control unit configured to open the first temperature responsive valve in response to input from a temperature sensor associated with the first temperature responsive valve.

7. The cooling system of claim 1, wherein the first temperature responsive valve is a retrofit application to the second cooling circuit.

8. An internal combustion engine system, comprising:
   an engine block having one or more combustion cylinders;
   one or more turbochargers;
   an engine cooling circuit having a first heat exchanger configured to receive a first coolant flowing from a cooling channel in the engine block and to reduce the temperature of the first coolant, the engine cooling circuit being adapted with an engine cooling circuit drain line;
   an aftercooler cooling circuit having a second heat exchanger configured to receive a second coolant flowing from an aftercooler associated with at least one turbocharger and to reduce the temperature of the second coolant, the aftercooler cooling circuit being adapted with an aftercooler cooling circuit drain line;
   a principal drain line adapted for fluid communication with the engine cooling circuit and the aftercooler cooling circuit;
   a first temperature responsive valve disposed on the aftercooler cooling circuit drain line, the first temperature responsive valve configured to open to allow mixing of the first and second coolants in response to the temperature of the second coolant being at a preselected minimum temperature; and
   a second temperature responsive valve disposed on the principal drain line and configured to open to drain the engine and aftercooler cooling circuits in response to the temperature of the coolant in the principal drain line being at a preselected minimum temperature.

9. The internal combustion engine system of claim 8, wherein the engine cooling circuit is configured to operate at a higher temperature than the aftercooler cooling circuit.

10. The internal combustion engine system of claim 8, wherein the first temperature responsive valve is configured to open when the temperature of the second coolant is at around 40-60° F., and the second temperature responsive valve is configured to open when the temperature of the first and second coolants is at around 35-40° F.

11. The internal combustion engine system of claim 8, wherein the first temperature responsive valve is a thermostatic valve.

12. The internal combustion engine system of claim 8, wherein the first temperature responsive valve is an electronically controlled valve.

13. The internal combustion engine system of claim 8, further comprising a control unit configured to open the first temperature responsive valve in response to input from a temperature sensor associated with the first temperature responsive valve.

14. The internal combustion engine system of claim 8, wherein the first temperature responsive valve is a retrofit application to the aftercooler cooling circuit drain line.

15. A method of cooling an internal combustion engine having one or more turbochargers, comprising the steps of:
   providing an engine cooling circuit for circulating a first coolant through the engine to absorb heat from the engine, the engine cooling circuit being adapted with an engine cooling circuit drain line;

providing an aftercooler cooling circuit for circulating a second coolant through an aftercooler associated with at least one of the turbochargers to absorb heat from the aftercooler, the aftercooler cooling circuit being adapted with an aftercooler cooling circuit drain line having a first temperature responsive valve disposed thereon;

providing a principal drain line capable of fluid communication with both the engine cooling circuit drain line and the aftercooler cooling circuit drain line, the principal drain line having a second temperature responsive valve disposed thereon;

maintaining the first temperature responsive valve closed when the temperature of the second coolant is above a preselected minimum temperature; and opening the first temperature responsive valve when the temperature of the second coolant is at the preselected minimum temperature, allowing the first and second coolants to mix.

16. The method of claim 15, further comprising the step of opening the second temperature responsive valve when the temperature of the first and second coolants is at a preselected minimum temperature, allowing the first and second coolants to drain from the engine cooling circuit and the aftercooler cooling circuit.

17. The method of claim 15, wherein the steps are performed on an internal combustion engine of a railroad locomotive.

18. The method of claim 15, wherein opening of the first temperature responsive valve occurs when the temperature of the second coolant is at around 40-60° F.

19. The method of claim 16, wherein opening of the second temperature responsive valve occurs when the temperature of the first and second coolants is at around 35-40° F.

20. The method of claim 15, wherein the first temperature responsive valve disposed on the aftercooler cooling circuit drain line is a retrofitted application.

* * * * *